United States Patent
Tilbrook et al.

(10) Patent No.: US 7,968,179 B2
(45) Date of Patent: *Jun. 28, 2011

(54) PRE-IMPREGNATED COMPOSITE MATERIALS WITH IMPROVED PERFORMANCE

(75) Inventors: David Tilbrook, Saffron (GB); Dana Blair, Hardwick (GB); Maureen Boyle, Castro Valley, CA (US); Paul Mackenzie, Purley (GB)

(73) Assignees: Hexcel Composites, Ltd., Duxford (GB); Hexcel Corporation, Dublin, CA (US)

( * ) Notice: Subject to any disclaimer, the term of this patent is extended or adjusted under 35 U.S.C. 154(b) by 742 days.

This patent is subject to a terminal disclaimer.

(21) Appl. No.: 11/787,700

(22) Filed: Apr. 17, 2007

(65) Prior Publication Data
US 2008/0081170 A1    Apr. 3, 2008

(30) Foreign Application Priority Data
Oct. 2, 2006 (GB) .................................. 0619401.3

(51) Int. Cl.
 *B32B 27/04* (2006.01)
 *B32B 27/38* (2006.01)
 *C08L 63/00* (2006.01)
 *C08L 63/02* (2006.01)

(52) U.S. Cl. ............ 428/297.4; 428/413; 428/414; 428/415; 428/417; 525/523; 525/526

(58) Field of Classification Search ............ 428/297.4, 428/413, 415, 417; 523/400; 525/523, 524, 525/525, 526
See application file for complete search history.

(56) References Cited

U.S. PATENT DOCUMENTS

| | | |
|---|---|---|
| 4,539,253 A | 9/1985 | Hirschbuehler et al. |
| 4,604,319 A | 8/1986 | Evans et al. |
| 4,608,404 A | 8/1986 | Gardner et al. |
| 4,957,801 A | 9/1990 | Maranci et al. |
| 5,028,478 A | 7/1991 | Odagiri et al. |
| 5,268,223 A | 12/1993 | Qureshi et al. |
| 5,317,068 A | 5/1994 | Watanabe et al. |
| 5,599,629 A | 2/1997 | Gardner et al. |
| 5,972,810 A | 10/1999 | Gabrisch et al. |
| 5,985,431 A | 11/1999 | Oosedo et al. |
| 6,045,898 A | 4/2000 | Kishi et al. |
| 6,287,696 B1 | 9/2001 | Noda et al. |
| 6,429,157 B1 | 8/2002 | Kishi et al. |
| 6,440,257 B1 | 8/2002 | Zhou et al. |
| 6,444,187 B1 | 9/2002 | Miyoshi et al. |
| 6,508,910 B2 | 1/2003 | Zhou et al. |
| 6,515,081 B2 | 2/2003 | Oosedo et al. |
| 2008/0286578 A1* | 11/2008 | Tilbrook et al. ............... 428/413 |

FOREIGN PATENT DOCUMENTS

| | | |
|---|---|---|
| EP | 0326177 A2 | 8/1989 |
| EP | 0392348 A3 | 10/1990 |
| EP | 0411834 | 2/1991 |
| EP | 0745640 A | 12/1996 |
| EP | 0819723 A1 | 8/1997 |
| JP | 61246228 A | 11/1986 |
| JP | 63305124 A | 12/1988 |
| JP | 06009752 | 1/1994 |
| JP | 2005105151 A | 4/2005 |
| WO | WO 2005/113652 A2 | 12/2005 |

OTHER PUBLICATIONS

Full substance data for MY0600, provided by STN registry (no date).*
Full substance data for MY0510, provided by STN registry (no date).*

* cited by examiner

*Primary Examiner* — Michael J Feely
(74) *Attorney, Agent, or Firm* — W. Mark Bielawski; David J. Oldenkamp

(57) ABSTRACT

Pre-impregnated composite material (prepreg) is provided that can be molded to form composite parts that have high levels of both strength and damage tolerance without causing any substantial negative impact upon the physical or chemical characteristics of the uncured prepreg or cured part. This is achieved by including in the matrix resin a substantial amount of a multifunctional aromatic epoxy resin that has at least one phenyl group that is meta-substituted.

22 Claims, No Drawings

PRE-IMPREGNATED COMPOSITE MATERIALS WITH IMPROVED PERFORMANCE

BACKGROUND OF THE INVENTION

1. Field of the Invention

The present invention relates generally to pre-impregnated composite material (prepreg) that is used in making high performance composite parts. More particularly, the invention is directed to providing prepreg that may be cured/molded to form composite parts having both improved strength and damage tolerance.

2. Description of Related Art

Composite materials are typically composed of a continuous resin matrix and reinforcing fibers as the two primary constituents. The composite materials are often required to perform in demanding environments, such as in the field of aerospace, and therefore physical limits and characteristics of the composite are of critical importance. In particular, when determining how light certain composite material parts can be made, composite tensile strength and modulus are important factors.

Pre-impregnated composite material (prepreg) is used widely in the manufacture of composite parts. Prepreg is a combination of an uncured resin matrix and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network have a large affect on the structural properties of the part. Prepreg is a preferred material for use in manufacturing load-bearing structural parts and particularly aerospace composite parts. It is important that these parts have sufficient strength, damage tolerance and other requirements that are routinely established for such parts.

The fiber reinforcements that are commonly used in aerospace prepreg are multidirectional woven fabrics or unidirectional tape that contains fibers extending parallel to each other. The fibers are typically in the form of bundles of numerous individual fibers or filaments that are referred to as a "tows". The fibers or tows can also be chopped and randomly oriented in the resin to form a non-woven mat. These various fiber reinforcement configurations are impregnated with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of pre-preg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The tensile strength of a cured composite material is largely dictated by the individual properties of the reinforcing fiber and matrix resin, as well as the interaction between these two components. In addition, the fiber-resin volume ratio is an important factor. Cured composites that are under tension tend to fail through a mechanism of accumulated damage arising from multiple tensile breakages of the individual fiber filaments located in the reinforcement tows. Once the stress levels in the resin adjacent to the broken filament ends becomes too great, the whole composite can fail. Therefore, fiber strength, the strength of the matrix, and the efficiency of stress dissipation in the vicinity of broken filament ends will contribute to the tensile strength of a cured composite material.

In many applications, it is desirable to maximize the tensile strength property of the cured composite material. However, attempts to maximize tensile strength can often result in negative effects on other desirable properties, such as the compression performance and damage tolerance of the composite structure. In addition, attempts to maximize tensile strength can have unpredictable effects on the tack and out-life of the prepreg. The stickiness or tackiness of the uncured prepreg is commonly referred to as "tack". The tack of uncured prepreg is an important consideration during lay up and molding operations. Prepreg with little or no tack is difficult to form into laminates that can be molded to form structurally strong composite parts. Conversely, prepreg with too much tack can be difficult to handle and also difficult to place into the mold. It is desirable that the prepreg have the right amount of tack to insure easy handling and good laminate/molding characteristics. In any attempt to increase strength and/or damage tolerance of a given cured composite material, it is important that the tack of the uncured prepreg remain within acceptable limits to insure suitable prepreg handling and molding.

The "out-life" of prepreg is the length of time that the prepreg may be exposed to ambient conditions before undergoing an unacceptable degree of curing. The out-life of prepreg can vary widely depending upon a variety of factors, but is principally controlled by the resin formulation being used. The prepreg out-life must be sufficiently long to allow normal handling, lay up and molding operations to be accomplished without the prepreg undergoing unacceptable levels of curing. In any attempt to increase strength and/or damage tolerance of a given cured composite material, it is important that the out-life of the uncured prepreg remain as long as possible to allow sufficient time to process, handle and lay up the prepreg prior to curing.

The most common method of increasing composite tensile performance is to change the surface of the fiber in order to weaken the strength of the bond between matrix and fiber. This can be achieved by reducing the amount of electro-oxidative surface treatment of the fiber after graphitization. Reducing the matrix fiber bond strength introduces a mechanism for stress dissipation at the exposed filament ends by interfacial de-bonding. This interfacial de-bonding provides an increase in the amount of tensile damage a composite part can withstand before failing in tension.

Alternatively, applying a coating or "size" to the fiber can lower the resin-fiber bond strength. This approach is well known in glass fiber composites, but can also be applied to composites reinforced with carbon fibers. Using these strategies, it is possible to achieve significant increases in tensile strength. However, the improvements are accompanied by a decrease in properties, such as compression after impact (CAI) strength, which requires high bond strength between the resin matrix and fibers.

Another alternative approach is to use a lower modulus matrix. Having a low modulus resin reduces the level of stress that builds up in the immediate vicinity of broken filaments. This is usually achieved by either selecting resins with an intrinsically lower modulus (e.g. cyanate esters), or by incorporating an ingredient such as an elastomer (carboxy-terminated butadiene-acrylonitrile [CTBN], amine-terminated butadiene-acrylonitrile [ATBN] and the like). Combinations of these various approaches are also known.

Selecting lower modulus resins can be effective in increasing composite tensile strength. However, this can result in a tendency to damage tolerance, which is typically measured by a decrease in compressive properties, such as compression after impact (CAI) strength and open hole compression (OHC) strength. Accordingly, it is very difficult to achieve a simultaneous increase in both the tensile strength and damage tolerance Although existing prepregs are well suited for there intended use in providing composite parts that are strong and damage tolerant. There still is a continuing need to provide prepreg that may be used to make composite parts that have even higher levels of both strength and damage tolerance. However, this increase in strength and damage tolerance needs to be achieved without negatively affecting the tack and out-life of the prepreg, as well as other physical properties of the cured composite structure.

SUMMARY OF THE INVENTION

In accordance with the present invention, pre-impregnated composite material (prepreg) is provided that can be molded to form composite parts that have high levels of both strength and damage tolerance. This is achieved without causing any substantial negative impact upon the physical or chemical characteristics of the uncured prepreg or the cured composite part.

The pre-impregnated composite materials of the present invention are composed of reinforcing fibers and a matrix. The matrix includes a dysfunctional epoxy resin in combination with a multifunctional aromatic epoxy resin with a functionality greater than two wherein the multifunctional aromatic epoxy resin has at least one phenyl group that is meta-substituted. The matrix further includes thermoplastic particles, a thermoplastic toughening agent and a curing agent.

The present invention also covers methods for making the prepreg and methods for molding the prepreg into a wide variety of composite parts. The invention also covers the composite parts that are made using the improved prepreg.

It has been found that the selection and combination of the components of the present invention results in the formation of prepreg that may be molded to form composite parts that have both improved tensile strength and compression after impact (CAI) strength in comparison to conventional systems.

Additionally, it has surprisingly been found that the benefits of improved tensile strength and CAI strength can be obtained without substantially affecting the other desirable physical properties of the prepreg (e.g. tack and out-life) or the resultant cured composite material (e.g. matrix-fiber bonding, damage tolerance, stress dissipation, compression performance, and the like).

The above described and many other features and attendant advantages of the present invention will become better understood by reference to the following detailed description.

DETAILED DESCRIPTION OF THE INVENTION

The pre-impregnated composite materials (prepreg) of the present invention may be used as a replacement for existing prepreg that is being used to form composite parts in the aerospace industry and in any other application where high structural strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes.

The pre-impregnated composite materials of the present invention are, like all conventional prepreg, composed of reinforcing fibers and an uncured matrix. The reinforcing fibers can be any of the conventional fiber configurations that are used in the prepreg industry. However, the matrix is a departure from conventional prepreg industry practice. Specifically, the matrix includes a dysfunctional epoxy resin in combination with a multifunctional aromatic epoxy resin with a functionality greater than two wherein the multifunctional aromatic epoxy resin has at least one phenyl group that is meta-substituted. The matrix further includes thermoplastic particles, a thermoplastic toughening agent and a curing agent.

It was discovered that the use of an epoxy resin with a functionality greater than two having at least one meta-substituted phenyl ring in its backbone in place of the para-substituted glycidyl amine resins, which are conventionally used in aerospace prepreg matrices, imparts greater toughness to the composite material, as well as increasing the base resin modulus. This gives rise to a step change in the compression after impact (CAI) performance. Surprisingly, the matrix resins of the present invention also impart very high tensile strength (e.g. open hole tensile strength—OHT) to the composite material.

The dysfunctional epoxy resin used to form the matrix may be any suitable dysfunctional epoxy resin. It will be understood that this includes any suitable epoxy resins having two epoxy functional groups. The dysfunctional epoxy resin may be saturated, unsaturated, cylcoaliphatic, alicyclic or heterocyclic.

Dysfunctional epoxy resins, by way of example, include those based on: diglycidyl ether of Bisphenol F, Bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, Epikote, Epon, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof. The dysfunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Brewster, N.Y.) under the trade names Araldite GY281 and GY285. The dysfunctional epoxy resin may be used alone or in any suitable combination.

The dysfunctional epoxy resin is present in the range 10 wt % to 40 wt % of the matrix resin. Preferably, the dysfunctional epoxy resin is present in the range 15 wt % to 35 wt %. More preferably, the dysfunctional epoxy resin is present in the range 22 wt % to 28 wt %.

The second component of the matrix is an epoxy resin with a functionality greater than two that has at least one meta-substituted phenyl ring in its backbone. It will be understood that this includes epoxy resins having an epoxy group functionality greater than two. Preferred multifunctional epoxy resins are those that are trifunctional or tetrafunctional. Most preferably, the multifunctional epoxy resin is trifunctional.

A trifunctional epoxy resin will be understood as having the three epoxy groups substituted either directly or indirectly in a meta orientation on the phenyl ring in the backbone of the compound. A tetrafunctional epoxy resin will be understood as having the four epoxy groups substituted either directly or indirectly in a meta orientation on the phenyl ring in the backbone of the compound.

It is also envisaged that the phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (New York, N.Y.) under the name Tetrad-X), and Erisys GA-240 (from CVC Chemicals, Moorestown, N.J.). Suitable trifunctional epoxy resins, by way of example, include those based upon Bisphenol F, Bisphenol A (optionally brominated), phenol and cresol epoxy novolacs, glycidyl ethers of phenol-aldehyde adducts, aromatic epoxy resins, dialiphatic triglycidyl ethers, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

A preferred trifunctional epoxy resin is triglycidyl meta-aminophenol. Triglycidyl meta-aminophenol is available commercially from Huntsman Advanced Materials under the trade name Araldite MY0600, and from Sumitomo Chemical Co. (Osaka, Japan) under the trade name ELM-120.

The epoxy resin with a functionality greater than two having at least one meta-substituted phenyl ring in its backbone is present in the range 15 wt % to 45 wt % of the resin matrix. Preferably, the meta-substituted epoxy resin is present in the range 20 wt % to 40 wt %. Most preferred are matrix resins in which the multifunctional meta-substituted epoxy is present in the range of 25 wt % to 30 wt %.

The matrix resin may include one or more multifunctional epoxy resins in addition to the required meta-substituted multifunctional epoxy resin. The additional multifunctional epoxy resins are those that have an epoxy functionality of at least three, and which do not have a phenyl ring in the their backbone that is meta-substituted with an epoxy group. The additional optional multifunctional epoxy resins may be saturated, unsaturated, cylcoaliphatic, alicyclic or heterocyclic.

Suitable additional multifunctional epoxy resins, by way of example, include those based upon, glycidyl ethers of phenol-aldehyde adducts, aromatic epoxy resins, dialiphatic triglycidyl ethers, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

Specific examples of suitable additional multifunctional epoxy resin include, by way of example, N,N,N',N'-tetraglycidyl-4,4'-diaminodiphenyl methane (TGDDM available commercially as Araldite MY720 and MY721 from Huntsman Advanced Materials, or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl), and methane-based epoxy resin such as Tactix 742 (available commercially from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials).

The additional multifunctional epoxy resins may be used alone or in any suitable combination. The additional multifunctional epoxy resin(s), if present, should be in the range 0.1 wt % to 20 wt % of the matrix resin. Preferably, the multifunctional epoxy resin(s) is(are) present in the range 1 wt % to 15 wt %. More preferably, the multifunctional epoxy resin(s) is(are) present in the range 5 wt % to 10 wt %.

The prepreg matrix in accordance with the present invention also includes insoluble thermoplastic particles. The term 'insoluble thermoplastic particles' as used herein means any suitable material that is thermoplastic and in a powder form, atomized form, or particle form and which remains substantially in particulate form in the prepreg resin matrix prior to curing. The insoluble thermoplastic particles may undergo some melting when the temperature of the matrix is increased during curing. However, the particles substantially reform and remain in particulate form in the final cured matrix.

The insoluble thermoplastic particles are polymers, which can be in the form of homopolymers, block copolymers, graft copolymers, or terpolymers. The insoluble thermoplastic particles may be thermoplastic resins having single or multiple bonds selected from carbon-carbon bonds, carbon-oxygen bonds, carbon-nitrogen bonds, silicon-oxygen bonds, and carbon-sulphur bonds. One or more repeat units may be present in the polymer which incorporate the following moieties into either the main polymer backbone or to side chains pendant to the main polymer backbone: amide moieties, imide moieties, ester moieties, ether moieties, carbonate moieties, urethane moieties, thioether moieties and carbonyl moieties. The thermoplastic can also have a partially cross-linked structure. It can be either crystalline or amorphous or partially crystalline.

Suitable examples of insoluble thermoplastic particles include, by way of example, polyamides, polycarbonates, polyacetal, polyphenylene oxides, polyphenylene sulphides, polyarylates, polyethers, polyesters, polyimides, polyamidoimides, polyether imides, polyurethanes, and polyether ketones.

The insoluble thermoplastic particles may be chosen, by way of example, from polyamide 6 (caprolactame—PA6), polyamide 12 (laurolactame—PA12), polyamide 11 or any combination thereof. Preferred insoluble thermoplastic particles are polyamide particles that have a melting point of between about 150° C. and 250° C. The particles should have particle sizes of below 100 microns It is preferred that the average particle size be around 20 microns. Suitable polyamide particles are available commercially from Arkerna of France under the trade name Orgasol.

The insoluble thermoplastic particles are present in the range 35 wt % to 1 wt % of the matrix. Preferably, the insoluble thermoplastic particles are present in the range 20 wt % to 5 wt %. More preferably, the insoluble thermoplastic particle are present in the range 20 wt % to 10 wt %. Most preferred, the insoluble thermoplastic particles are present in the range of 10 wt % to 15 wt % of the matrix.

In order to achieve further improvements in damage tolerance (CAI) and in open hole tensile strength, it is preferred that at least some of the insoluble thermoplastic particles, which are preferably polyamide particles, have melting points that are below the prepreg cure temperature (typically 180° C.) and that such low melting particles be used alone or in combination with higher melting polyamide particles.

Polyamide particles come in a variety of grades that have different melting temperatures depending upon the particular polyamide, degree of copolymerization and degree of crystallinity. Particles that contain polyamide 6 (PA6) typically have melting points above typical epoxy prepreg curing temperatures. Accordingly, little if any dissolution of the PA6 particles occurs during cure. Orgasol 1002 D NAT1 (100% PA6) with a melting point of 217° C. (DSC) and particle sizes of 20 microns is an example of such a high melting polyamide particles. On the other hand, polyamide 12 (PA12) particles and copolymers of PA6 and PA12 have melting temperatures that are generally below the typical curing temperature for epoxy prepregs. These types of low melting particles undergo substantial melting at cure temperatures and are reformed into particles as the cured composite is cooled.

Preferred polyamide particles are PA6 particles and particles that are copolymers of PA6 and PA12. For example Orgasol 3502 D NAT 1 is a copolymer of 50% PA12 and 50% PA 6 that has a melting point of 142° C. with particle sizes averaging around 20 microns. As a further example, development grade Orgasol CG199 is a copolymer of 80% PA12 and 20% PA6 that has a melting point of 160° C. with average particle sizes also being around 20 microns. As another example, Orgasol 3801 DNAT1 is a copolymer of PA12 and PA6 that has a melting point of 160° C., particle size 20 microns and a higher molecular weight than CG199. The molecular weight of Orgasol 3801 DNAT1 is comparable to the Orgasol 1002 DNAT1. Orgasol CG213 is another preferred copolymer particle that contains 80% PA12 and 20% PA6, has a melting point of 160° C., particles sizes of around 20 microns and a higher molecular weight than Orgasol CG199. Use of Orgasol CG 199 or CG213 by themselves is not preferred due to a decrease in CAI even though the OHT increases. Accordingly, it is preferred that Orgasol CG199 or CG213 be combined with higher melting polyamide particles.

The above identified polyamide homopolymer and copolymer particles may be included in the matrix alone or in combination. However, it is preferred that a mixture of polyamide particles be used that includes a high melting polyamide component (i.e. melting temperature above the curing temperature for the prepreg) and a low melting polyamide component (i.e. melting temperature below the curing temperature for the prepreg). However, the relative amounts of high and low melting particles may be varied, if desired. It was found that by using at least some low melting polyamide particles (copolymer of PA6 and PA12), it is possible to obtain low modulus interleave without affecting the modulus of the base resin, and additionally without compromising the overall water resistance of the composite under wet conditions to the effects of humidity.

The prepreg matrix resin includes at least one curing agent. Suitable curing agents are those which facilitate the curing of the epoxy-functional compounds of the invention and, particularly, facilitate the ring opening polymerization of such epoxy compounds. In a particularly preferred embodiment, such curing agents include those compounds which polymerize with the epoxy-functional compound or compounds, in the ring opening polymerization thereof. Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylenetetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines, e.g., 1,3-diaminobenzene, 1,4-diaminobenzene, 4,4'-diaminodiphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS).

Also, suitable curing agents may include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398 (commercially available as CG-125 from Ajinomoto USA Inc. (Teaneck, N.J.)), is also suitable.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent(s) are selected such that they provide curing of the resin component of the composite material when combined therewith at suitable temperatures. The amount of curing agent required to provide adequate curing of the resin component will vary depending upon a number of factors including the type of resin being cured, the desired curing temperature and curing time. Curing agents typically include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman. The curing agent is present in an amount that ranges from 45 wt % to 5 wt % of the uncured matrix. Preferably, the curing agent is present in an amount that ranges from 30 wt % to 10 wt %. More preferably, the curing agent is present in the range 25 wt % to 15 wt % of the uncured matrix. Most preferred are matrix resins that contain from 16 wt % to 22 wt % curing agent.

4,4'-DDS is a preferred curing agent. It is preferably used as the sole curing agent in amounts ranging from 16 wt % to 33 wt %. It was discovered that the more reactive 3,3'-DDS provided increased strength in the neat cured resins, but that the resulting prepregs had tack properties that were not nearly as good as those using the less reactive 4,4'-DDS. Accordingly, to achieve the optimum balance of prepreg outlife, tack and mechanical performance of the cured composite part, it is preferred that less reactive curing agents, such as 4,4'-DDS and the like, be used at an amine to epoxy stoicheometry of about 70 to 80 percent.

The matrix of the present invention also preferably includes a thermoplastic toughening agent. Any suitable thermoplastic polymers may be used as the toughening agent. Typically, the thermoplastic polymer is added to the resin mix as particles that are dissolved in the resin mixture by heating prior to addition of the curing agent. Once the thermoplastic agent is substantially dissolved in the hot matrix resin precursor (i.e. the blend of epoxy resins), the precursor is cooled and the remaining ingredients (curing agent and insoluble thermoplastic particles) are added.

Exemplary thermoplastic toughening agents/particles include any of the following thermoplastics, either alone or in combination: polyimides, aramids, polyketones, polyetheretherketones, polyesters, polyurethanes, polysulphones, polyethersulfones, high performance hydrocarbon polymers, liquid crystal polymers, PTFE, elastomers, and segmented elastomers.

Toughening agent is present in the range 45 wt % to 5 wt % of the uncured resin matrix. Preferably, the toughening agent is present in the range 25 wt % to 5 wt %. More preferably, the toughening agent is present in the range 20 wt % to 10 wt %. Most preferably, the toughen agent is present in the range of 13 wt % to 17 wt % of the matrix resin. A suitable toughening agent, by way of example, are PES particles sold under the tradename Sumikaexcel 5003P, which is commercially available from Sumitomo Chemicals. Alternatives to 5003P are Solvay polyethersulphone 105PS, or the non-hydroxyl terminated grades such as Solvay 104P.

The matrix resin may also include additional ingredients, such as performance enhancing or modifying agents and additional thermoplastic polymers provided they do not adversely affect the tack and outlife of the prepreg or the strength and damage tolerance of the cured composite part. The performance enhancing or modifying agents, for example, may be selected from flexibilizers, toughening agents/particles, accelerators, core shell rubbers, flame retardants, wetting agents, pigments/dyes, UV absorbers, antifungal compounds, fillers, conducting particles, and viscosity modifiers. Suitable additional thermoplastic polymers for use as additional toughening agents include any of the following, either alone or in combination: polyether sulphones (PES), polyether ethersulphones (PEES), polyphenyl sulphones, polysulphones, polyimides, polyetherimide, aramid, polyesters, polyketones, polyetheretherketones (PEEK), polyurethane, polyureas, polyarylether, polyarylsulphides, polycarbonates, polyphenylene oxides (PPO) and modified PPO.

Suitable accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (Dyhard UR500 from Degussa or UR2T from CVC Chemicals).

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon nanotubes and carbon nanofibres. Metal-coated fillers may also be used, for example nickel coated carbon particles and silver or copper coated silica particles.

The matrix resin may comprise an additional polymeric resin which is at least one thermoset resin. The term "thermoset resin" includes any suitable material which is plastic and usually liquid, powder, or malleable prior to curing and designed to be molded into a final form. Once cured, a thermoset resin is not suitable for melting and remolding. Suitable thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, bismaleimide, vinyl ester, benzoxazine and phenolic resins. If desired, the matrix may include further suitable resins containing phenolic groups, such as resorcinol based resins, and resins formed by cationic polymerization, such as DCPD—phenol copolymers. Still additional suitable resins are melamine-formaldehyde resins, and urea-formaldehyde resins.

The resin matrix is made in accordance with standard prepreg matrix processing. In general, the various epoxy resins are mixed together at room temperature to form a resin mix to which the thermoplastic toughening agent is added. This mixture is then heated to a temperature above the melting point of the thermoplastic toughening agent for a sufficient time to substantially melt the toughening agent. The mixture is then cooled down to room temperature or below and the remainder of the ingredients (insoluble thermoplastic particles, curing agent and other additive, if any) are mixed into the resin to form the final matrix resin that is impregnated into the fiber reinforcement.

The matrix resin is applied to the fibrous reinforcement in accordance with any of the known prepreg manufacturing techniques. The fibrous reinforcement may be fully or partially impregnated with the matrix resin. In an alternate embodiment, the matrix resin may be applied to the fiber fibrous reinforcement as a separate layer, which is proximal to, and in contact with, the fibrous reinforcement, but does not substantially impregnate the fibrous reinforcement. The prepreg is typically covered on both side with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems which comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. It is envisaged that use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements of Villeurbanne, France.

The prepreg may be in the form of continuous tapes, tow-pregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary preferred matrix resin includes between about 22 wt % and 25 wt % Bisphenol-F diglycidyl ether; between about 25 wt % and 30 wt % triglycidyl-m-aminophenol (trifunctional epoxy resin); between about 17 wt % and 21 wt % diaminodiphenylsulphone (primarily 4,4-DDS as a curing agent); between about 10 wt % and 15 wt % insoluble thermoplastic particles, and between about 13 wt % and 17 wt % poly(ether sulphone) as a toughening agent.

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures around 180° C. The composite material may more preferably be cured using a method selected from UV-visible radiation, microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful in many other high performance composite applications including automotive, rail and marine applications where high tensile strength, compressive strength, and resistance to impact damage are needed.

In order that the present invention may be more readily understood, reference will now be made to the following background information and examples of the invention.

EXAMPLE 1

A preferred exemplary resin formulation in accordance with the present invention is set forth in TABLE 1. A matrix resin was prepared by mixing the epoxy ingredients at room temperature with the polyethersulfone to form a resin blend that was heated to 120° C. for 120 minutes to completely dissolve the polyethersulfone. The mixture was cooled to 80° C. and the rest of the ingredients added and mixed in thoroughly.

TABLE 1

| Amount (Wt %) | Ingredient |
| --- | --- |
| 24.80 | Bisphenol-F diglycidyl ether (GY281) |
| 28.03 | Trifunctional meta-glycidyl amine (MY0600) |
| 18.66 | Aromatic diamine curative (4,4-DDS) |
| 15.00 | Toughener (Sumikaexcel 5003P polyether sulfone) |
| 13.50 | Thermoplastic particles (Orgasol 1002 DNAT 1-Nylon 6) |

Exemplary prepreg was prepared by impregnating one or more layers of unidirectional carbon fibers with the resin formulation of TABLE 1. The unidirectional carbon fibers had an areal weight of 268 gsm and in all cases the matrix resin amounted to 35 weight percent of the total uncured prepreg weight. A variety of prepreg lay ups were prepared using standard prepreg fabrication procedures. The prepregs were cured in an autoclave at 180° C. for about 2 hours. The cured prepregs were then subjected to standard tests to determine their tensile strength and tolerance to damage as described below.

In-plane shear strength (IPS) and modulus (IPM) were determined at room temperature using an 8-ply (+45/−45) laminate. The laminate was cured for 2 hours at 180° C. in an autoclave and gave a nominal thickness of 2 mm. Consolidation was verified by C-scan. The specimens were cut and tested according to Airbus Test Method AITM 1.0002. Results quoted are not normalized.

Compression after Impact (CAI) was determined at 25 Joule using a 16-ply laminate in which the layers of unidirectional fibers were oriented quasi-isotropically. The laminate was cured at 180° C. for 2 hours in the autoclave. The final laminate thickness was about 4 mm. The consolidation was verified by c-scan. The specimens were cut and tested in accordance with Airbus test method AITM 1.0010 issue 2, June 1994

Open hole compression (OHC) was determined at room temperature using a 20-ply laminate in which the unidirectional layers were oriented 40/40/20 during lay-up. The laminate was cured for 2 hours at 180° C. in an autoclave and gave a nominal thickness of 5 mm. Consolidation was verified by C-scan. The specimens were cut up and tested in accordance with Airbus test method AITM 1.0008. Results are values normalized to 60% volume fraction based on nominal cure ply thickness with calculation carried out as per EN 3784 method B.

Open hole tension (OHT) was determined at room temperature using a 20-ply laminate in which the unidirectional layers were oriented 40/40/20 during lay-up. The laminate was cured for 2 hours at 180° C. in an autoclave and gave a nominal thickness of 5 mm. Consolidation was verified by C-scan. The specimens were cut up and tested in accordance with Airbus test method AITM 1.0008. The results are values that were normalized to 60% volume fraction based on nominal cure ply thickness with calculation carried out as per EN 3784 method B.

The cured prepreg had an IPS of about 101 MPa and an IPM of about 5.5 GPa. The OHT was about 780 MPa with the OHC and CAI being about 370 MPa and 292 MPa, respectively.

A comparative prepreg (C1) was made and tested in the same manner as the above-described preferred exemplary prepreg. C1 was identical to the exemplary prepreg except that trifunctional para-glycidyl amine (MY0510) was substituted in place of the trifunctional meta-glycidyl amine (MY0600). The resulting cured prepreg had an IPS of about 72 MPa and an IPM of about 5.1 GPa. The OHT was about 752 MPa with the OHC and CAI being about 361 MPa and 227 MPa, respectively.

The above comparative example C1 demonstrates that an unexpected substantial increase in both tensile strength and damage tolerance occurs when trifunctional meta-glycidyl amine epoxy is used in place of trifunctional para-glycidy amine epoxy. In addition, this increase in both tensile strength and damage tolerance was achieved without adversely affecting the outlife and tack of the prepreg or the other physical/chemical properties of the cured part.

A second comparative prepreg (C2) was prepared in which the matrix resin contained a combination of trifunctional para-glycidyl amine epoxy resin and tetrafunctional para-glycidy amine epoxy resin. Specifically, the resin contained: 22.2 wt % GY281 dysfunctional epoxy; 10.1 wt % MY0510 (trifunctional para-glycidyl amine epoxy); 21.1 wt % MY721 (tetrafunctional para-glycidyl epoxy); 13.5 wt % Orgasol 1002 particles; 14.0 Sumikaexcel 5003P PES; and 19.2 wt % 4,4'-DDS. The C2 prepreg was otherwise the same as the preferred exemplary prepreg and was cured and tested in the same manner. The cured C2 prepreg had an IPS of about 92 MPa and an IPM of about 5.2 GPa. The OHT was about 735 MPa with the OHC and CAI being about 376 MPa and 257 MPa, respectively.

Comparative example C2 demonstrates that the replacement of a substantial portion of the trifunctional para-substituted epoxy (MY0510) in C1 with a tetrafunctional para-substituted epoxy (MY721) does provide some increase in most of the properties measured. However, the degree of increase was not nearly as great as with the use of a meta-substituted trifunctional epoxy in accordance with the present invention

EXAMPLE 2

Additional exemplary prepregs (A-D) were also prepared, cured and tested in the same manner as Example 1. The prepregs were the same as Example 1 except that the formulations for the matrix resins were changed. The formulations are set forth in TABLE 2.

TABLE 2

| Ingredient | A Wt % | B Wt % | C Wt % | D Wt % |
|---|---|---|---|---|
| 4,4'-DDS | 9.33 | 22.40 | 11.20 | 7.01 |
| 3,3'-DDS | 9.33 | — | 11.20 | 15.39 |
| GY281 | 24.80 | 23.05 | 23.05 | 23.05 |
| MY0600 | 28.03 | 26.05 | 26.05 | 26.05 |
| Sumikaexcel 5003P | 15.00 | 15.00 | 15.00 | 15.00 |
| Orgasol 1002 | 13.50 | 13.50 | 13.50 | 13.50 |

As can be seen from TABLE 2, the exemplary matrix resin A is the same as in Example 1, except that the curing agent was changed to a combination of 4,4'-DDS and 3,3'-DDS. For matrix resin B the amount of curing agent was increased above that in Example 1 with a corresponding decrease in the epoxy resin components. For matrix resins C and D, the amount of curing agent was increased and combinations of 4,4'-DDS and 3,3'-DDS were used.

The results of testing on cured prepreg using resin matrices A-D are set forth in TABLE 3.

TABLE 3

|  | A | B | C | D |
|---|---|---|---|---|
| IPS (MPa) | 97 | 106 | 103 | 92 |
| IPM (Gpa) | 5.5 | 5.7 | 5.5 | 5.3 |
| OHT (MPa) | 797 | 820 | 823 | 825 |
| OHC (MPa) | 410 | 423 | 402 | 406 |
| CAI (MPa) | 277 | 295 | 286 | 270 |

As can be seen from TABLE 3, the strength and damage tolerance of the cured prepregs varies when differing amounts and types of curing agents are used. All of the cured prepreg exhibited substantial increases in both tensile strength and damage tolerance when compared to the C1 prepreg of Example 1. It should be noted that the tack and out life properties of the prepreg made in accordance with this example did vary, but were generally acceptable for typical handling, lay up and curing processes. However, the tack and out life properties of the prepreg of Example 1 were more acceptable. Accordingly, the curing agent amount and combination (i.e. substantially all 4,4'-DDS and the like) used in Example 1 is preferred.

EXAMPLE 3

An additional example (3E) of prepreg was made in accordance with the present invention. The prepreg included a carbon fiber reinforcement (268 gsm areal weight) that was similar to the carbon fiber used in the preceding examples, except that a different fiber surface treatment was used. The formulation for the matrix resin is set forth in TABLE 4. A comparative prepreg (C3) was also prepared. The matrix formulation for C3 is also set forth in TABLE 4.

TABLE 4

| Ingredient Wt % | C3 | 3E |
|---|---|---|
| Araldite MY721 | 21.10 |  |
| Araldite MY0510 | 10.10 |  |
| Araldite MY0600 |  | 28.03 |
| Araldite GY281 | 22.10 | 24.80 |
| Sumikaexel 5003 | 14.00 | 15.00 |
| Orgasol 1002N | 13.50 | 13.50 |
| 4,4' DDS | 19.20 | 18.66 |

Prepreg laminates were prepared and cured in the same manner as the preceding examples in order to conduct the standard mechanical tests set forth above for OHT and CAI. The results of the tests are set forth in TABLE 5.

TABLE 5

|  | C3 | 3E |
|---|---|---|
| OHT (MPa) | 594 | 677 |
| CAI (MPa) | 314 | 358 |

The results of these examples demonstrate that the use of different fiber sizing or fiber coating treatments can result in variations in the strength and damage tolerance of the cured prepreg. For example prepreg C3 was the same as prepreg C2, except for the use of a different coating on the carbon fibers. The CAI for C3 was 56 MPa higher than C2, but the OHT of C3 was 141 MPa less. The use of other surface coatings are also expected to possibly give similar differences in cured prepreg strength and damage tolerance when identical matrix resins are used.

However, as also demonstrated by the Examples, the present invention provides a relative increase in cured prepreg strength and damage tolerance, regardless of the particular coating or sizing that is being used. For example, the cured prepreg of Example 1 is the same as the cured prepreg of Example 3E, except for the use of the different coating on the carbon fibers. The cured prepreg of Example 1 had a CAI that was 35 MPa higher than C2 and an OHT that was 45 MPa higher. Likewise, the cured prepreg of Example 3E had a CAI that was 45 MPa higher than C3 and an OHT that was 83 MPa higher.

EXAMPLE 4

Three additional examples of prepreg (F-H) were made in accordance with the present invention. The prepreg included a carbon fiber reinforcement (268 gsm areal weight) that was the same as the fiber used in Example 3. The formulations for the three matrix resins are set forth in TABLE 6.

TABLE 6

| Ingredient Wt % | F | G | H |
|---|---|---|---|
| Araldite MY721 | | | 10.00 |
| Araldite MY0510 | 7.77 | 7.36 | |
| Araldite MY0600 | 20.00 | 18.96 | 25.00 |
| Araldite GY285 | 24.55 | 23.27 | 16.54 |
| Sumikaexel 5003 | 15.00 | 15.00 | 15.00 |
| Orgasol 1002N | 13.50 | 13.50 | 13.50 |
| 4,4' DDS | 19.18 | 21.91 | 19.96 |

Exemplary prepregs F-H utilize the low viscosity bisphenol-F epoxy GY285 instead of GY281, which is a moderate viscosity bisphenol-F epoxy. In addition, prepregs F-H include mixtures of meta-substituted trifunctional epoxy (MY0600) and para-substituted polyfunctional epoxies (MY0510 and MY721. These prepregs were used to prepare laminates which were tested according to Boeing test methods in BMS 8-276 and demonstrated increased tensile strength and damage tolerance compared to similar laminates prepared from prepregs that did not contain meta-trifunctional epoxy.

EXAMPLE 5

Additional exemplary prepregs (1-M) were also prepared, cured and tested in the same manner as Example 1. The prepregs were the same as Example 1 except that the formulations for the matrix resins were changed. The formulations are set forth in TABLE 7.

TABLE 7

| Component (wt %) | I | J | K | L | M |
|---|---|---|---|---|---|
| GY281 | 24.80 | 24.80 | 24.80 | 24.80 | 26.19 |
| MY0600 | 28.03 | 28.03 | 28.03 | 28.03 | 29.60 |
| PES 5003P | 15.00 | 15.00 | 15.00 | 15.00 | 15.00 |
| 4,4-DDS | 18.66 | 18.66 | 18.66 | 18.66 | 19.70 |
| Orgasol 1002 DNAT1 | 6.75 | 6.75 | | | 4.75 |
| Orgasol 3502 DNAT1 | | 6.75 | 13.50 | | 4.75 |
| CG 199 Development grade | | | | 13.50 | |
| Orgasol 3801 DNAT1 | 6.75 | | | | |

The cured prepregs were subjected to the same testing procedures as in Example 1. The results are set forth in TABLE 8.

TABLE 8

| | I | J | K | L | M |
|---|---|---|---|---|---|
| IPS (MPa) | 97 | 103/116 | 100.2 | 70 | 117 |
| IPM (GPa) | 4.9 | 5.0/5.0 | 4.6 | 4.3 | 4.9 |
| OHT (MPa) | — | 817/831 | 814 | 1070 | — |
| OHC (MPa) | 375 | 394/415 | 394 | 393 | 399 |
| CAI (MPa) | 326 | 296/340 | 308 | 243 | 333 |

The above exemplary prepreg (I-M) demonstrate that various types and combinations of thermoplastic particles may be used in accordance with the present invention to provide additional increases in both tensile strength and damage tolerance. It is apparent that using Orgasol 3502 in combination with Orgasol 1002 (prepregs J and M) provides an increase in both the CAI and OHT of the cured prepreg when compared to the prepreg of Example 1, which uses Orgasol 1002 alone. In addition, the combination Orgasol 3502 with Orgasol 1002 gives higher CAI and OHT values than when Orgasol 3502 is used alone, as in prepreg K.

Prepreg L shows that using Orgasol CG 199 in place of Orgasol 1002 had an unexpected effect on OHT. A high OHT value (1070) was recorded for the cured prepreg. However, the CAI value (243) was relatively low due to lower particle molecular weight.

In accordance with the present invention, the amount of meta-substituted polyfunctional epoxy, along with the other required ingredients, must be sufficient to provide cured prepreg that have an IPS of at least 70 MPa; and IPM of at least 4.6 GPa; an OHC of at least 360 MPa; an OHT of at least 790 MPa and a CAI of at least 260 MPa as measured according to the standard test procedures set forth in Example 1.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:
1. A pre-impregnated composite material comprising:
A) reinforcing fibers; and
B) a matrix comprising:
a) a from 10 to 40 weight percent of dysfunctional epoxy resin;
b) from 15 to 45 weight percent of a trifunctional epoxy resin comprising triglycidyl meta-aminophenol;

c) from 1 to 35 weight percent insoluble thermoplastic particles;
d) from 5 to 45 weight percent thermoplastic toughening agent; and
e) from 10 to 30 weight percent curing agent.

2. A pre-impregnated composite material according to claim 1 wherein the amount of said matrix in said pre-impregnated composite material is between about 25 weight percent and 45 weight percent.

3. A pre-impregnated composite material according to claim 1 wherein said reinforcing fibers are selected from the group consisting of glass, carbon and aramid.

4. A pre-impregnated composite material according to claim 2 wherein said reinforcing fibers are in the form of woven fabric, unidirectional fibers, randomly oriented fibers or quasi-isotropic chopped unidirectional fiber tape.

5. A pre-impregnated composite material according to claim 1 wherein said dysfunctional epoxy resin is selected from the group consisting of diglycidyl ether of bisphenol F, diglycidyl ether of bisphenol A, diglycidyl dihydroxy naphthalene and combinations thereof.

6. A pre-impregnated composite material according to claim 1 wherein said matrix further comprises N,N,N',N'-tetraglycidyl-m-xylenediamine or N,N,N',N'-tetraglycidyl-4,4'-diaminodiphenyl methane.

7. A pre-impregnated composite material according to claim 1 wherein said insoluble thermoplastic particles comprise polyamide particles.

8. A pre-impregnated composite material according to claim 1 wherein said toughening agent is selected from the group consisting of polyether sulfone, polyether ethersulfone, polyphenyl sulphone, polysulfone, polyimide, polyetherimide, aramid, polyester, polyketone, polyetheretherketone, polyurethane, polyurea, polyarylether, polyarylsulphide, polycarbonate and polyphenylene oxide.

9. A pre-impregnated composite material according to claim 1 wherein said curing agent is an aromatic amine.

10. A pre-impregnated composite material according to claim 1 wherein said matrix comprises:
15 to 35 weight percent of said dysfunctional epoxy resin;
20-40 weight percent of said trifunctional epoxy resin;
10-20 weight percent of said insoluble thermoplastic particles;
10-20 weight percent of said thermoplastic toughening agent; and
15-25 weight percent of said curing agent.

11. A pre-impregnated composite material according to claim 10 wherein said dysfunctional epoxy resin is diglycidyl ether of bisphenol F.

12. A pre-impregnated composite material according to claim 11 wherein said insoluble thermoplastic particles comprises polyamide particles.

13. A pre-impregnated composite material according to claim 12 wherein said polyamide particles comprise both low melting and high melting polyamide particles.

14. A pre-impregnated composite material according to claim 12 wherein said thermoplastic toughening agent is polyether sulfone.

15. A pre-impregnated composite material according to claim 14 wherein said curing agent is 4,4-diaminodiphenylsulfone.

16. A pre-impregnated composite material according to claim 15 wherein said matrix comprises:
22 to 25 weight percent of said diglycidyl ether of bisphenol F;
25 to 30 weight percent of said trifunctional epoxy resin;
10 to 15 weight percent of said polyamide particles;
13 to 17 weight percent of said polyether sulfone; and
17 to 21 weight percent of said 4,4-diaminodiphenylsulfone.

17. A composite part that comprises a pre-impregnated composite material according to claim 1 wherein said matrix has been cured.

18. A method for making a composite part comprising the step of curing a pre-impregnated composite material according to claim 1.

19. A pre-impregnated composite material according to claim 1 wherein said matrix further comprises conducting particles.

20. A pre-impregnated composite material according to claim 19 wherein said conducting particles are selected from the group of particles consisting of silver, gold, copper, aluminum, nickel, conducting grades of carbon, buckminsterfullerene, carbon nanotubes, carbon nanofibers, nickel coated carbon particles, silver coated silica particles and copper coated silica particles.

21. A pre-impregnated composite material according to claim 20 wherein said conducting particles comprise conducting grades of carbon.

22. A method for making a pre-impregnated composite material comprising the steps of:
A) providing a reinforcing fiber; and
B) impregnating said reinforcing fiber with a matrix wherein said matrix comprises:
a) a from 10 to 40 weight percent of dysfunctional epoxy resin;
b) from 15 to 45 weight percent of a trifunctional epoxy resin comprising triglycidyl meta-aminophenol;
c) from 1 to 35 weight percent insoluble thermoplastic particles;
d) from 5 to 45 weight percent thermoplastic toughening agent; and
e) from 10 to 30 weight percent curing agent.

* * * * *

UNITED STATES PATENT AND TRADEMARK OFFICE
CERTIFICATE OF CORRECTION

| | |
|---|---|
| PATENT NO. | : 7,968,179 B2 |
| APPLICATION NO. | : 11/787700 |
| DATED | : June 28, 2011 |
| INVENTOR(S) | : David Tilbrook et al. |

Page 1 of 1

It is certified that error appears in the above-identified patent and that said Letters Patent is hereby corrected as shown below:

Column 3, line 30, Column 4, lines 9, 28, 29, 31, 34, 43 and 50, Column 13, line 17, Column 16, Claim 1, line 4, Column 17, Claim 5, line 2, Column 17, Claim 10, line 3 and Column 18, Claim 22, line 6, for the term "dysfunctional", each occurrence, should read -- difunctional --.

Signed and Sealed this
Ninth Day of August, 2011

David J. Kappos
*Director of the United States Patent and Trademark Office*